Figure 1:
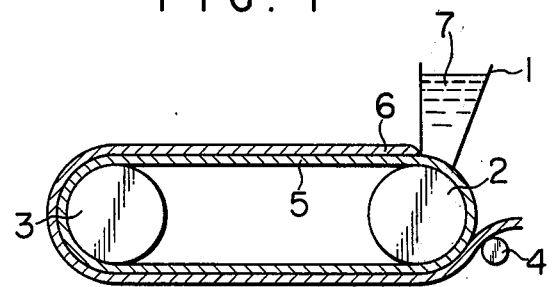

United States Patent [19]
Nakano et al.

[11] 3,966,390
[45] June 29, 1976

[54] MOLD FOR POLYIMIDE, POLYAMIDE, OR POLYAMIDE-IMIDE RESIN WHICH HAS NOBLE METAL LAYER ON ITS SURFACE TO BE IN CONTACT WITH RESIN

[75] Inventors: Mineo Nakano; Takeshi Koyama, both of Hitachi; Yoshiro Matsumoto, Ibaragi; Akira Maruoka, Hitachi, all of Japan

[73] Assignee: Hitachi Chemical Company, Ltd., Japan

[22] Filed: Aug. 21, 1973

[21] Appl. No.: 389,659

[52] U.S. Cl. .............................. 425/470; 425/224; 425/DIG. 55; 425/471; 29/199; 428/458
[51] Int. Cl.² ...................... B29C 1/02; B29C 1/04
[58] Field of Search ............ 425/224, 223, DIG. 55, 425/470; 204/46, 109; 264/239; 161/213; 29/199

[56] References Cited
UNITED STATES PATENTS

| | | | |
|---|---|---|---|
| 2,097,593 | 11/1937 | Kinsella | 425/224 X |
| 2,488,446 | 11/1949 | Swiss | 425/224 X |
| 3,017,284 | 1/1962 | Lambert et al. | 425/DIG. 55 |

Primary Examiner—Robert L. Spicer, Jr.
Attorney, Agent, or Firm—Craig & Antonelli

[57] ABSTRACT

In making films or molded articles from polyamide, polyimide, or polyamide-imide resins, the problem of stripping or release is successfully solved by applying a noble metal layer on the surface of a film-casting belt or plate or a casting mold to be in contact with the resins.

1 Claim, 2 Drawing Figures

MOLD FOR POLYIMIDE, POLYAMIDE, OR POLYAMIDE-IMIDE RESIN WHICH HAS NOBLE METAL LAYER ON ITS SURFACE TO BE IN CONTACT WITH RESIN

This invention relates to a film-casting belt or plate or a casting mold which is used in processing synthetic resins containing an amide or imide linkage or both, and which has noble metal layer on the surface to be in contact with the resins.

In making films from a high polymer material, for example, a synthetic resin containing an amide or imide linkage or both linkages, such as, for example, a polyamide resin, polyimide resin, or poly(amide-imide) resin by using a polished steel plate, chromium-plated plate, stainless steel plate or glass plate, the film formed cannot be stripped from the polished steel plate, chromium-plated plate, and stainless steel plate even though the film-making conditions such as temperature, time, etc. are diversely varied. In the case of the glass plate, although the stripping of the formed film is easy, a number of problems arise when used in an actual film production equipment.

Although stripping is made easy also in the case of polished steel plate, chromium-plated plate, and stainless steel plate by coating the film-casting surface with a silicone as a releasing agent, there still arise problems concerning homogeneity and even thickness of the film.

Conventionally, in stripping the film from a film-casting belt or in releasing the molded article from a mold, there have been adopted such means as polishing or plating of the surface of a casting belt or a casting mold, or the use of a releasing agent such as a silicone. However, with the recent remarkable advance in high polymer materials, there are some new high polymer materials, such as, for example, the above-noted resins containing an amide linkage and/or an imide linkage, which are difficult to strip from a film-casting belt or release from a casting mold even though a conventional stripping or releasing technique has been applied in film casting or in molding. Such difficulty has deterred the high polymer materials from expanded uses.

An object of this invention is to eliminate the said difficulty.

Another object of this invention is to provide a film-casting belt or plate or a casting mold for polyimide resins, polyamide resins or poly(amide-imide) resins.

Other objects and advantages of this invention will become apparent from the following description.

According to this invention, there is provided a mold for a synthetic resin containing an amide linkage and/or an imide linkage, characterized by having a noble metal layer on the surface to be in contact with the resin. The term "mold" used hereinafter includes a film-casting belt and plate and a casting mold for the resin.

Examples of the synthetic resins to be suitably processed by use of the mold include poly(amide-imide) resins obtained from trimellitic anhydride and diisocyanates, or from trimellitic anhydride halides and diamines, etc.; polyimides obtained from pyromellitic anhydride and diamines, etc.; and polyamides such as nylon obtained from polybasic acids such as adipic acid and polyfunctional amines such as hexamethylenediamine, etc.

In the mold of this invention, a chromium-plated plate, stainless steel plate, polished steel plate, and the like are either plated with a noble metal such as silver, gold, platinum, or tungsten, or overlaid with a thin layer of such a noble metal, whereby the stripping of a film or the releasing of a molded article is effected as easily as from a glass plate.

Figure 2:
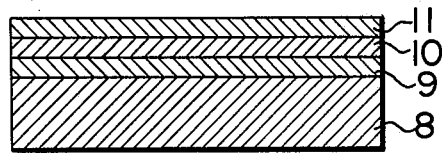

The invention is further illustrated below in detail with reference to examples and the accompanying drawings, in which FIG. 1 is a schematic diagram of a film-casting equipment which utilizes a film-casting belt, and FIG. 2 is a sectional view of a part of an example of the film-casting belt of this invention. However, these examples and drawings are merely illustrative and not limitative.

EXAMPLE 1

Into a 3-liter, four-necked flask provided with a stirrer, a nitrogen inlet tube, a thermometer, and a cooler are charged 524 g of diphenyl ether diisocyanate, 600 ml of N-methyl-2-pyrrolidone, and then 600 ml of N-methyl-2-pyrrolidone containing 384 g of trimellitic anhydride dissolved therein. The resulting solution is heated to a temperature of 80° to 100°C., when the reaction takes place vigorously and evolution of carbon dioxide becomes recognizable. The temperature is further elevated and the solution is stirred at 125° to 135°C. for about one hour, while the color of the solution turns from colorless to yellow, then to red and the viscosity thereof increases markedly. After heating for about two hours, the reaction is terminated. The poly(amide-imide) resin thus obtained had an intrinsic viscosity of 0.75 dl/g, as measured in dimethylacetamide at 30°C.

By use of a film-casting equipment shown in FIG. 1, a film is formed from the poly(amide-imide) resin obtained above. It has been found impossible to strip the film from either a chromium-plated or stainless steel belt used as the casting belt, whereas the film was easily stripped from a belt which had been subjected to a plating treatment as shown in FIG. 2, wherein 8 is a stainless steel belt, 9 is a nickel layer, 10 is a gold layer, and 11 is a silver layer. The casting temperature is 200°C., the airflow 1,500 m$^3$/hr., and the casting speed 1 m/min.

In FIG. 1, an N-methyl-2-pyrrolidone solution of a poly(amide-imide) resin 7 supplied to a knife coater 1 is spread on a film-casting belt 5 to deposit a film 6. The film is stripped from the casting belt by a film-stripping roll 4. Rolls 2 and 3 are driving rolls for the film-casting belt. The film-casting belt may be a sheet of stainless steel, chromium-plated steel, or iron directly plated with a noble metal such as gold, silver, platinum, or tungsten. In FIG. 2, however, nickel plating 9, gold plating 10, and silver plating 11 are provided on the surface of the sheet in consideration of bonding and thermal relation between the noble metal layer and the stainless steel sheet 8.

The substitution of platinum for the silver in the above Example gives the same result.

EXAMPLE 2

The polyimide resin used in this Example is prepared in the following manner. In a 3-liter, four-necked flask provided with a stirrer, a nitrogen inlet tube, a thermometer, and a cooler is placed 200 g of diaminodiphenyl ether. After addition of 1870 g of N-methyl-2-pyrrolidone, the mixture is stirred. On confirming the complete dissolution of diaminodiphenyl ether, 218 g of pyromellitic anhydride is gradually added to the solution while maintaining the temperature below 30°C. in an ice bath. Since the reaction is accompanied by generation of heat, care is taken to keep the temperature from rising above 30°C. by efficient cooling. Pyromellitic anhydride is added gradually over a period of about 1 hour. After addition of pyromellitic anhydride, the viscosity of the solution increases to such a degree that stirring becomes difficult. After the complete addition of pyromellitic anhydride, cooling is discontinued and the solution is continually stirred at room temperature for about 2 hours. Thereafter, the temperature is elevated to 80°C. to continue the reaction. When the temperature reaches 80°C., a part of amide acid changes into an imide form and the viscosity of the solution begins to decrease. After confirming that the viscosity of the solution becomes 200 poises at 30°C., the reaction is terminated. The polyimide resin thus obtained has an intrinsic viscosity of 0.70 dl/g in dimethylacetamide at 30°C.

The same operation as in Example 1 is repeated using the same apparatus as in Example 1. It has been found that the film is easily stripped from the casting belt.

The substitution of platinum for the silver in the above Example results similarly in an easy stripping of the film from the casting belt.

In this invention, the noble metal layer may be formed by a conventional technique such as plating or overlay. The noble metal layer in contact with a resin is preferably that of silver in view of favorable workability.

As stated in the foregoing, this invention makes it possible to obtain homogeneous films, sheetings, or molded articles having a desired thickness or size from a high polymer material containing an amide linkage and/or an imide linkage by applying a noble metal layer to the surface of a film-casting belt or of a casting mold by plating or overlaying to ensure extremely easy stripping or release of the high polymer material from the film-casting belt or the casting mold, the stripping or releasing said high polymer material having been difficult with conventional techniques.

Film-making particularly from a poly(amide-imide) and a polyimide has been impossible with a conventional technique, and, hence, must depend upon this invention.

The idea of this invention may be applicable not only to a film-casting belt or a casting mold, but also to the cases where film and sheeting are treated with a hot roll to overcome the difficulty of adhesion of the film and sheeting to the roll.

What is claimed is:

1. A mold for molding a synthetic resin containing an amide linkage, an imide linkage or both linkages comprising a stainless steel belt, a layer of plated nickel on one surface of said stainless steel belt, a layer of plated gold on said layer of plated nickel, and a layer of plated silver on said layer of plated gold.

* * * * *